April 28, 1964  N. E. HAGER, JR  3,131,304
DIFFERENTIAL RADIOMETER FOR SENSING NET RATE OF HEAT EXCHANGE
Filed March 24, 1961
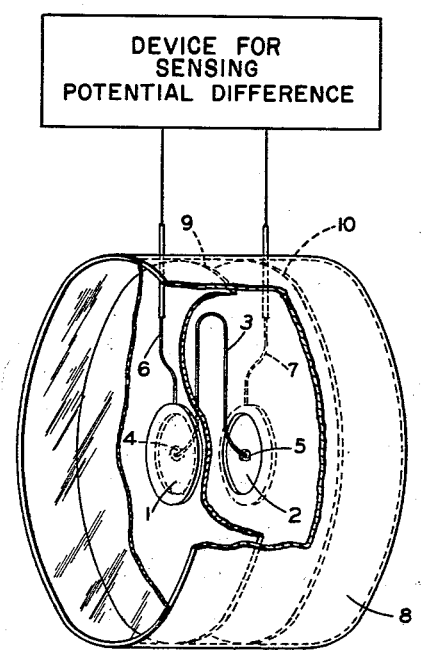
INVENTOR.
NATHANIEL E. HAGER, JR.
BY

United States Patent Office 3,131,304
Patented Apr. 28, 1964

3,131,304
DIFFERENTIAL RADIOMETER FOR SENSING NET RATE OF HEAT EXCHANGE
Nathaniel E. Hager, Jr., Manheim Township, Lancaster County, Pa., assignor to Armstrong Cork Company, Lancaster, Pa., a corporation of Pennsylvania
Filed Mar. 24, 1961, Ser. No. 98,099
6 Claims. (Cl. 250—83.3)

This invention relates generally to a device capable of detecting thermal radiation. More particularly, the invention relates to a device capable of sensing the net rate of exchange of heat by thermal radiation between two regions in a normal environment. Still more particularly, the invention relates to a differential radiometer capable of detecting radiant heat fluxes of the order of 0.1 B.t.u. per hour-ft.$^2$ or even less, using sufficiently sensitive sensing instruments.

The invention contemplates a differential radiometer comprising in combination a first thermocouple comprising a first plate connected to a wire to form a first junction. This first junction is the actual thermocouple since it is capable of producing thermoelectric current. The invention includes a second thermocouple comprising a second plate having a second junction formed by connecting the second plate to the same wire which is connected to the first plate. This second junction is also a thermocouple capable of producing thermoelectric current. The thermoelectric potential produced is detected by two lead wires, one each leading from the first plate and the second plate to a sensing instrument capable of detecting minute potential differences such as a potentiometer or a microvoltmeter.

The differential radiometer of the present invention is best explained by reference to the accompanying drawing.

In the drawing, the first plate 1 and the second plate 2 are thin sheets in the shape of squares, circles, or other suitable shape, of a metal useful in forming thermocouples. The plates 1 and 2 are connected with the wire 3 which is also made of a metal useful in forming thermocouples. The metal used to make plates 1 and 2 and the metal used to make the wire 3 should be dissimilar so that the actual junction of the thermocouple capable of producing thermoelectric potential is formed where the two dissimilar metals are joined as at the first junction 4 and the second junction 5. The loop in the wire 3 is present simply to minimize transfer of heat by conduction between plates 1 and 2 through the wire 3.

Lead 6 is connected to plate 1 and lead 7 is connected to plate 2 in order that the potential difference between the two plates 1 and 2 may be measured by the sensing instrument.

It will be apparent that the microvoltages produced by junctions 4 and 5 are opposed and not additive. Therefore, if junctions 4 and 5 are both heated so as to maintain the same temperature at each junction, the leads 6 and 7 would pick up no voltage increases. It is only when one of the junctions 4 and 5 is warmed more than the other that a voltage will appear across the leads 6 and 7. It is for this reason that the device is aptly called a differential radiometer; the device detects temperature differences across the two junctions instead of absolute temperatures.

The materials used to form the junctions 4 and 5 may be any of those dissimilar metals normally used to form thermocouples. For example, there may be used platinum-platinum (90%), rhodium (10%); platinum-platinum (87%), rhodium (13%); Chromel P-Alumel; iron-constantan; copper-constantan; platinum-platinum iridium; and any other metal couples. Since one of the two metals is to be used in the form of two plates, that metal will generally be the one most easily formed into foils and sheets. Preferably, the plates are made of copper and the connecting wire between the two plates is made of constantan. One advantage of the copper-constantan couple is that copper lead wires can be used to connect to the sensing instrument without concern for the introduction of additional couples.

In the drawing, plates 1 and 2 are shown positioned back-to-back, that is, the junctions 4 and 5 are positioned in opposition to one another and the planes of the plates 1 and 2 are parallel. This position is most convenient, but other positions may be utilized. It is apparent that the faces of plates 1 and 2, that is, the surfaces of the plates on the side opposite that of the junctions, need only be directed or pointed at two different regions between which a temperature differential is to be established. Thus plates 1 and 2 could, if necessary or desirable, be positioned in the same plane facing in the same direction so long as a separating wall or other means was used to insure that thermal radiation from two different regions impinged on the two plates separately. Where the plates are positioned as shown in the drawing, that is, back-to-back, it is preferred that the distance between the two plates be maintained at least ¼″ to maintain the sensitivity of the instrument. On the other hand, if the plates are positioned more than about ¾″ apart, transfer of heat between the two plates by convection becomes possible and the instrument may give erratic readings.

The diameters of plates 1 and 2 must be large enough so that radiation effects predominate to the exclusion of heat transfer by convection and conduction. For uses requiring reasonable sensitivity, the lower limit of the plate size should be about ¼″, whereas the upper limit may be any desirable dimension. The upper limit will be controlled by the ability to insulate the edges of the plates from heat transfer through conduction. Thickness of the plates should be such that the system does not posess too much inertia in arriving at equilibrium. Generally speaking, the plates will have a thickness ranging from .05″ to .0005″. The outer surfaces of both plates are preferably blackened as with a lacquer or other suitable blacking means in order to render the plates more sensitive to incident thermal radiation.

In the drawing, plates 1 and 2 are positioned in the center of a holder 8 by means of annular discs 9 and 10 of blackened paper. The plates 1 and 2 are simply cemented around their perimeters to openings in the center of the annular discs 9 and 10. The discs 9 and 10 are in turn cemented to the holder 8 at a convenient position therein. The holder 8 may be of any conducting structural material such as aluminum pipe. The tube should be isothermal to avoid affecting one side more than the other; therefore a tube which is a good conductor is preferred. If the inside surface of the tube is a good infrared reflector, the angle of view is enlarged.

Where the differential radiometer of the present invention is to be used in an open environment subject to air currents, it is preferred that the plates 1 and 2 be protected by windows sealing both open ends of the holder 8. These windows should be material which is reasonably transparent to thermal radiation, depending on the sensitivity desired of the instrument. Where great sensitivity is a factor, it is preferred that the windows be made of one-half mil clear polyethylene sheets. According to measurements, such sheets transmit over 90% of the infrared radiation emitted by a surface at normal room temperature. If large radiant heat fluxes are to be measured, windows which transmit a smaller percentage of incident thermal radiation may be used. If the differential radiometer is to be positioned inside a closed chamber such as the interior of a wall where it is to serve as a fire alarm device, no windows at all will be needed.

To illustrate the sensitivity of the differential radiometer of the present invention, a device was built wherein the holder 8 was an aluminum pipe 3½" in diameter and 1½" long. Plates 1 and 2 were ¾" in diameter and were positioned as shown in the drawing back-to-back ½" apart; the plates themselves were made of 0.005" copper foil blackened with dull black lacquer. The connecting wire was a piece of 0.005" diameter constantan wire soldered to the center of each of the two plates and measuring 2" in length; the constantan wire was looped as shown in the drawing. The plates 1 and 2 were held in place with two annular discs of black paper mounted inside the aluminum tubing as shown. A 0.002" copper wire was connected to each plate and then to a heavier lead which passed through the wall of the aluminum tube holder. The open ends of the holder were each covered with 0.0005" polyethylene clear film. The two output leads were connected to a Leeds and Northrup microvoltmeter using a center-reading meter.

This device was sufficiently sensitive to detect radiant heat fluxes on the order of 0.1 B.t.u. per hour-ft.$^2$ when used with a standard microvoltmeter. Fluxes ordinarily encountered in an average room where two parts of the room differ by about 1° F. are on the order of 1.0 B.t.u. per hour-ft.$^2$. The device readily responds when the human hand is brought in front of one or the other of the plates at a distance of about two feet from the plate. The turning-on of the overhead fluorescent lights in a room also causes noticeable response.

The differential radiometer of the present invention is useful in exploring radiative heat gains and losses in air-conditioning and heating field work. The device may be used for measuring or monitoring the temperature of a remote surface as compared with any other surface. It is particularly useful as a sensing element for a fire alarm system since it is not affected by the operating temperature level but only by temperature differences in various parts of its environment.

I claim:

1. A differential radiometer comprising in combination a first thermocouple comprising a first plate connected to a wire to form a first junction capable of producing thermoelectric current, a second thermocouple comprising a second plate connected to said wire to form a second junction capable of producing thermoelectric current, and lead wires connecting each of said plates to a device capable of sensing differences in potential.

2. A differential radiometer according to claim 1 wherein said plates are positioned back-to-back in parallel planes.

3. A differential radiometer according to claim 1 wherein the surfaces of said plates opposite to the surfaces carrying said junctions are blackened.

4. A differential radiometer according to claim 1 wherein said plates are made of copper sheets and said wire is made of constantan.

5. A differential radiometer according to claim 1 wherein said plates are enclosed in a container having windows therein capable of allowing thermal radiation to impinge on said plates.

6. A differential radiometer comprising in combination a first thermocouple comprising a thin copper plate blackened on one face and connected on the other face to a constantan wire, a second thermocouple comprising a second copper plate blackened on one face and connected on the other face to the same constantan wire connected to the first plate, copper lead wires adapted to connect each of said copper plates to a potentiometer, said first plate and said second plate being positioned in a container having windows therein capable of transmitting infrared radiation.

References Cited in the file of this patent

UNITED STATES PATENTS

| | | |
|---|---|---|
| 2,543,369 | Kling | Feb. 27, 1951 |
| 2,635,468 | Field et al. | Apr. 21, 1953 |
| 2,921,972 | Kreisler | Jan. 19, 1960 |